United States Patent
Dostal

(10) Patent No.: US 10,443,861 B2
(45) Date of Patent: Oct. 15, 2019

(54) HEAT EXCHANGER CONTROL AND DIAGNOSTIC APPARATUS

(71) Applicant: Jiri Dostal, Chocen (CZ)

(72) Inventor: Jiri Dostal, Chocen (CZ)

(73) Assignee: University Centre of Energy Efficient Buildings of the Czech Technical University in Prague, Bustehrad (CZ)

(*) Notice: Subject to any disclaimer, the term of this patent is extended or adjusted under 35 U.S.C. 154(b) by 0 days.

(21) Appl. No.: 15/577,882

(22) PCT Filed: Jun. 14, 2016

(86) PCT No.: PCT/CZ2016/050018
§ 371 (c)(1),
(2) Date: Nov. 29, 2017

(87) PCT Pub. No.: WO2016/202316
PCT Pub. Date: Dec. 22, 2016

(65) Prior Publication Data
US 2018/0149371 A1    May 31, 2018

(30) Foreign Application Priority Data

Jun. 15, 2015  (CZ) .................................... 2015-399

(51) Int. Cl.
*F24D 19/10*    (2006.01)
*G05D 23/19*    (2006.01)

(52) U.S. Cl.
CPC ..... *F24D 19/1012* (2013.01); *G05D 23/1931* (2013.01); *F24D 2220/042* (2013.01); *F28F 2200/00* (2013.01); *Y02B 30/745* (2013.01)

(58) Field of Classification Search
CPC ........... F24D 19/1012; F24D 2220/042; Y02B 30/745; G05D 23/1931; F28F 2800/00; F28F 2200/00
See application file for complete search history.

(56) References Cited

U.S. PATENT DOCUMENTS 5,615,733 A    4/1997  Yang
2010/0059598 A1*  3/2010  Lindgren ........... G05D 23/1917
                                                            236/91 E

FOREIGN PATENT DOCUMENTS

DE         4312150 A1    12/1994
DE    102007054313 A1     5/2009
(Continued)

OTHER PUBLICATIONS

International Search Report (Oct. 28, 2016) for corresponding International App. PCT/CZ2016/050018.

*Primary Examiner* — Marc E Norman
(74) *Attorney, Agent, or Firm* — WRB-IP LLP

(57) ABSTRACT

A heat exchanger control and diagnostic apparatus includes a heat exchanger having a primary inlet of a primary heat-transport liquid mounted with a first temperature sensor and a primary outlet of the primary heat-transport liquid mounted with a second temperature sensor, wherein the primary outlet is piped to a pump, the pump comprising a pump impeller connected to a motor, the primary heat-transport liquid being piped by plumbing from the pump impeller to a heat source and from the heat source back to the primary inlet, and a control unit connected to the heat exchanger and the pump and comprising a motor control unit bi-directionally connected to the motor. The heat exchanger has a secondary inlet for a secondary heat-transport liquid and a secondary outlet ducted to a temperature zone and back to the secondary inlet, the control unit being augmented by a temperature module, the temperature module having a first input connected by a communication channel to an output of the temperature sensor, and a second input connected by a communication channel to an output of the second temperature sensor, the temperature module having an output for outputting a primary inlet temperature connected to one input of a power calculation module, and (Continued)

an output for outputting a primary outlet temperature connected to another input of the power calculation module, the power calculation module having a third input connected to a flow estimation module, one input of the flow estimation module being connected to an output of a memory unit, and another input being connected by a bus to an output of the motor control unit, an output of the power calculation module for outputting a heat flow estimate being connected to one input of a heat flow controller, and another input of the heat flow controller for inputting a heat flow demand being connected to an output of an operator unit, and an output of the operator unit being connected to an input of the motor control unit.

6 Claims, 2 Drawing Sheets

(56) References Cited

FOREIGN PATENT DOCUMENTS

| WO | 2005106375 A1 | 11/2005 |
| WO | 2007031087 A1 | 3/2007 |

\* cited by examiner

HEAT EXCHANGER CONTROL AND DIAGNOSTIC APPARATUS

FIELD OF THE INVENTION

Heat transfer control is a necessary technology for many industrial processes and is a must in residential heating. Heat from a heat source is transported through a distribution network into terminal heat exchangers, where it is delivered. Power output control of the terminal heat exchangers is then important for temperature control in adjacent processes or thermal zones. Online diagnostics plays a major role in a correct and long-term heat exchanger operation.

BACKGROUND OF THE INVENTION

There is a solution, described in documents EP1752852B1, EP2778546A1, U.S. Pat. No. 5,443,207A, U.S. Pat. No. 5,622,221A, U.S. Pat. No. 4,629,116, US20100163221, U.S. Pat. No. 7,648,347B2, where there is a pump connected to a heat exchanger. A liquid mass flow through the pump is controlled directly by a temperature difference between either a heat-transfer liquid temperature or a thermal zone temperature and their respective setpoints. This solution uses only one temperature—the heat-transfer liquid of the thermal zone temperature. A disadvantage of this solution is the fact that a power output of the heat exchanger is not independent of inlet stream temperature changes. This solution does not yield a heat delivery control independent of temperature changes on the heat-transport liquid entering a heat exchanger.

An actual absolute heat exchanger power (a heat flow between primary and secondary heat-transfer liquid) is calculated from an actual volumetric flow of at least one heat-transport liquid and its temperature difference across the heat exchanger. There is a solution US20140222218, where there is a temperature sensor mounted on a primary stream inlet and outlet, and there is a flowmeter measuring flow rate of the primary stream. These sensor data are communicated to a control unit, where an actual absolute power is calculated. The flow rate in this solution is regulated by a motorized valve controlled by the control unit. The disadvantage of this solution is the necessity to use a flow meter to measure the flow rate. The flow meter usage dramatically increases the price of such a device and reduces reliability. This solution uses inlet and outlet primary stream temperature sensors and a flow meter.

The actual volumetric flow rate may also be inferred from an operation conditions of a pump; this solution is described for example in U.S. Pat. No. 8,714,934. The solution uses pump revolutions reading, pump electric power use, and a temperature sensor mounted to a pump motor stator coil to infer the flow rate. These sensor data are communicated to a microprocessor which, using previously stored pump power characteristics, calculates the actual flow rate through the pump. This method had, however, been published before the U.S. Pat. No. 8,714,934 priority date (2 Nov. 2007) in the article Ganapathy, V. "Check pump performance from motor data." CHEMICAL ENGINEERING 93.19 (1986): 91-92. The referred patent for this solution also does not cover an independent heat flow control.

A system of runtime heat exchanger diagnostics is known, for example, from U.S. Pat. No. 5,615,733. Here the heat exchanger is fitted with temperature sensors on an inlet and outlet of a hot stream, inlet and outlet of a cold stream and there is a flow meter mounted on the hot stream. These sensor data are communicated to a microprocessor, which calculates an overall heat exchange coefficient of the heat exchanger. The calculated heat exchange coefficient is then used to calculate a degree of fouling. A disadvantage of this solution is the need of a flowmeter.

Heat-use measuring is known, for example, from the solution U.S. Pat. No. 4,245,501. Two temperature sensors are attached to an inlet and outlet pipe of a heat exchanger, and there is a flowmeter mounted to this pipe. An analog electronic computation device then calculates an actual heat-use from a temperature difference across the heating terminal and a actual flow rate. A disadvantage of this solution is the need to use a flowmeter. There is also a solution US 2013/0259083 A1, which uses the same temperature measurements as the latter and an ultrasonic flowmeter. Sensor data are communicated to a microprocessor, and the actual heat-use is calculated there. A disadvantage of this solution is the utilization of a flowmeter.

SUMMARY OF THE INVENTION

The new invention comprises a device and a method of a heat exchange control of heat exchangers of, for example, a water-to-air type and a system of diagnostics of such heat exchangers.

In this solution, there is a first temperature sensor mounted to an inlet of a primary stream of a heat exchanger and a second temperature sensor mounted to an outlet of the primary stream from the heat exchanger. Primary outlet is fastened to a pump impeller housing, connected to an electric motor, which is from the other end connected by piping to a heat source, from where the pipes are connected back to the heat exchanger primary inlet closing the primary circuit. The pump, comprising an impeller and motor, is appended with a control unit. The control unit contains a motor control unit connected bi-directionally with the pump motor. Simultaneously, the heat exchanger has a secondary inlet to where a secondary heat-transport liquid enters the heat exchanger and a secondary outlet where it leaves to go to a thermal zone, from where it is ducted back to the secondary inlet. The key difference of the new device is that the control unit contains a temperature module whose first input is connected by the first communication channel with the output of the first temperature sensor and whose second input is connected by the second communication channel to the output of the second temperature sensor. Temperature module has primary inlet temperature output connected the first input of a power calculation module and has the primary outlet temperature output connected to the second input of the power calculation module. The third input to the power calculation module is connected to the flow estimation module. The flow estimation module has one input connected to the output of a memory unit and the other input with an output of a motor control unit. The output of the power calculation module—the heat flow estimate—is connected to one input of a heat flow controller whose other input—the heat flow demand—is connected to an output of an operator unit. The heat flow controller output is connected with the motor control unit sending a motor speed setting.

In one advantageous implementation, there is a third temperature sensor mounted to the secondary inlet of the heat exchanger and it the sensor data are sent through a third communication channel which connects the sensor to the third input of the temperature module in the control unit. The temperature module has its zone temperature output connected to one input of a temperature controller. The temperature controller has its other input—the temperature setpoint—connected to the second output of the operator unit and its output is connected to the heat flow demand input of the heat flow controller.

In other advantageous implementation, there is the third sensor on the secondary heat exchanger inlet replaced with a fourth sensor placed in the thermal zone. The data from the fourth temperature sensor and sent through a fourth communication channel to the third input of the temperature module of the control unit.

The control unit can be augmented by a diagnostics module, whose first input is connected to the primary inlet temperature output of the temperature module and whose second input is connected to the zone temperature output of the temperature module and whose third input is connected to the heat flow estimate output of the power calculation module. The output of the diagnostics module sending out diagnostic information is connected by a communication channel to the operator unit.

The control unit can also be augmented by a heat-use module, whose first input is connected to the heat flow estimate output of the power calculation module and whose output with the heat-use information is connected to the operator unit.

The advantage of the described solution is that the absolute heat flow within the heat exchanger is regulated independently of changes in the primary circuit liquid pressure, independently of primary inlet temperature changes and further independently of secondary inlet temperature changes and the secondary volumetric flow. If the device is used to control the thermal zone temperature, then the disturbances, mentioned above, do not propagate to the temperature of the zone. This mechanism enables for better zone temperature control quality.

The next advantage is the possibility to use the diagnostics module and get run-time diagnostic information. That enables for an early alert of a degrading efficiency or a malfunction of the heat exchanger. Maintenance or repair can be therefore done without any unnecessary delay.

The next advantage is the possibility to utilize the heat-use module that provides information about the heat usage during a certain period. It is beneficial in, for example, energy billing between consumers connected to one common heat supply.

BRIEF DESCRIPTION OF THE DRAWINGS

The particular examples of the technical solution are schematically depicted in the enclosed figures.

The figures show particular examples of the technical solution and by no means limit the protection given by the definition.

DETAILED DESCRIPTION OF THE INVENTION

Figure 1:
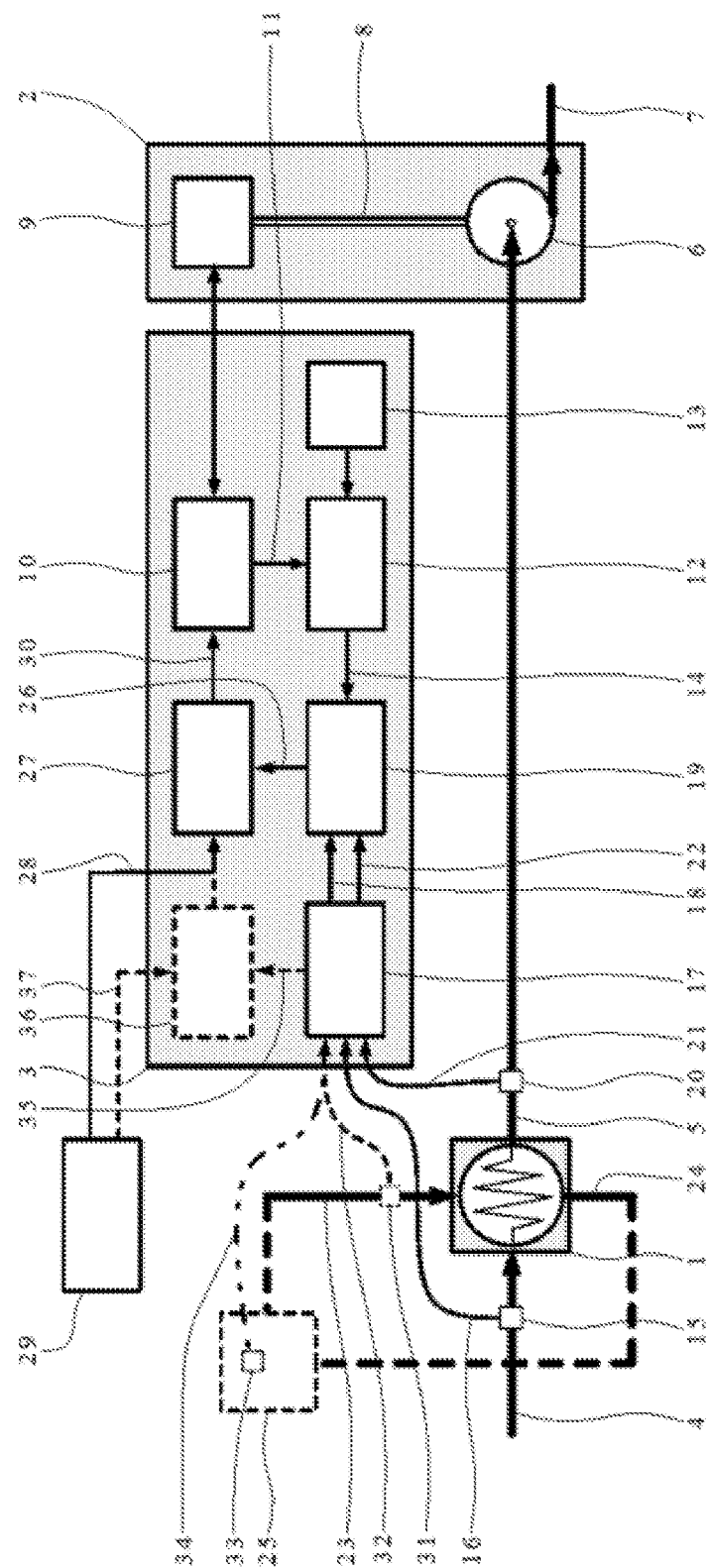
FIG. 1 shows a scheme of the connections between the pump, heat exchanger and the control unit with a temperature sensor mounting positions marked, and with an interconnection of the module allowing for heat flow control and zone temperature control.

The device depicted in FIG. 1 comprises the heat exchanger 1, the pump 2 and the control unit 3. The heat exchanger 1 has the primary inlet 4 of the primary heat-transport liquid having the first temperature sensor 15 mounted on and the primary outlet 5, where the primary heat-transport liquid leaves, with the second temperature sensor 20 mounted on. The primary outlet 5 is piped into the pump impeller housing 6, connected to the motor 9, from where it is piped by plumbing 2 to the heat source and back to the primary inlet 4. The heat exchanger 1 also has a secondary inlet 23 of the secondary heat-transport liquid and secondary outlet 24 connected through the thermal zone 25 back to the secondary inlet 23.

The control unit 3 is connected to the heat exchanger 1 and the pump 2. The control unit includes a temperature module 17, whose first input is connected by the first communication channel 16 to the output of the first temperature sensor 15, and whose second input is connected by the communication channel 21 to the output of the second temperature sensor. The temperature module 17 has its primary inlet temperature output 18 connected to the one input of the power calculation module 19 and its primary outlet output 22 connected to other input of the power calculation module 19. The last input 14 of the power calculation module 19 is connected to the output of the flow estimation module 12. The flow estimation module 12 is by one of its inputs connected to the output of the memory unit a and by other of its inputs connected, through a bus 11, to the output of the motor control unit 10. The control unit 10, which is bi-directionally connected to the motor 9 of the pump 2. The heat flow estimate output 26 of the power calculation module 19 is connected to the input of the heat flow controller 27, the other input of which—the heat flow demand 28—is connected to the first output of the operator unit 29. The output 30 of the heat flow controller 27 is connected to the input of the motor control unit 10.

Figure 4:
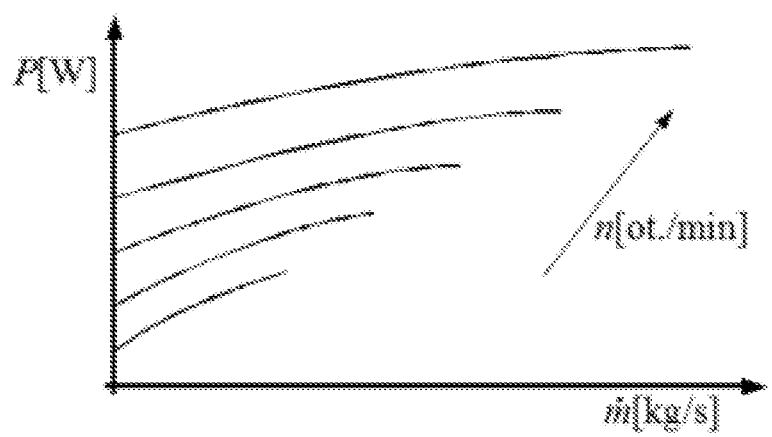
FIG. 4 shows flow-to-power characteristics of a pump.

The primary heat-transport liquid enters the heat exchanger 1 by the primary inlet 4, from where it leaves through the primary outlet 5, which pipes it into the housing of the pump impeller 6, from where it is piped by the plumbing 2 to the heat source and back to the primary inlet 4; this completes the primary circuit. The primary liquid is pumped through the primary circuit by the pump impeller 6 that is by a force link 8 driven by the motor 9. Electric current through the coils of the motor 9 is controlled by the motor control unit 10. The actual current value, driving electric source voltage and motor revolutions are communicated from the motor control unit 10 by the bus 11 into the flow estimation module 12. The flow estimation module 12 calculates the estimate of the flow through the primary circuit from information from the bus 11 and the flow-power characteristics, depicted in FIG. 4 and stored in the memory unit 13, and sends the information to the third input 14 of the power calculation module 19.

The memory module 13 stores the flow-power characteristics of the pump 2 for any admissible revolutions of the pump impeller 6 in the revolutions range of the pump 2.

The primary inlet temperature sensor 15 mounted to the primary inlet 4 sends the temperature information through the first communication channel 16, by cable or wirelessly, to the temperature module 17, which transforms the information into the primary inlet temperature 18 that is further communicated to the power calculation module 19. The primary outlet temperature sensor 20 is mounted on the primary outlet 6 and sends its temperature information through the communication channel 21, by cable or wirelessly, to the temperature module 17. The temperature module 17 transforms the information into the primary outlet temperature 22 which is further communicated to the power calculation module 19.

The secondary heat-transport liquid enters the heat exchanger 1 through the secondary inlet 22. It exchanges heat with the primary heat-transport liquid and is outputted through the secondary outlet 24, from where it is ducted to the thermal zone 25 and ducted back to the secondary inlet 23.

The power calculation module 19 calculates the actual estimated heat flow between the primary and secondary liquid in the heat exchanger 1. The heat flow estimate is communicated by the heat flow estimate output 26 to the heat flow controller 27. Heat flow controller 27 has its second input—the heat flow demand 28—connected to the first output of the operator unit 29. Heat flow controller 27 regulates by its output 30 the motor control unit 10, and consequently the pump impeller 6 revolutions, so that the heat flow estimate 26 asymptotically reaches the heat flow demand 28.

Alternatively, there may be a third temperature sensor 31 mounted to the secondary inlet 22. This third temperature sensor fl sends its temperature information through the third communication channel 2, by cable or wirelessly, to the third input of the temperature module 17. The temperature module 17 transforms the information into a zone temperature 5 that is communicated to the temperature controller 36. The second input of the temperature controller 36—the temperature setpoint 37—is connected to the second output of the operator unit 29. The output of the temperature controller 36 is connected to the second input—the heat flow demand 28—of the heat flow controller 27.

The zone temperature 3 can be alternatively obtained from the fourth temperature sensor 33 placed in the thermal zone 25. The sensor 35 sends its temperature information through the fourth communication channel 34, by cable or wirelessly, to the temperature module 17. The fourth communication channel 34 replaces the channel 32 in its connection to the third input to the temperature module 17.

The temperature controller 36 controls the heat demand input of the heat flow controller in such a way that the zone temperature 35 asymptotically reaches the temperature setpoint 37 communicated from the second output of the operator unit 29.

Figure 2:
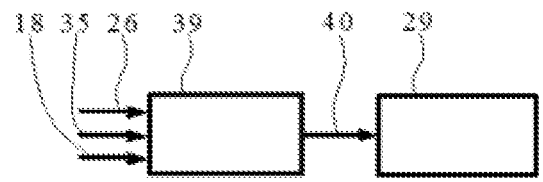
FIG. 2 shows the extension of the control unit by the diagnostics module.

The augmentation of the control unit 3 by the heat exchanger run-time diagnostics is depicted in FIG. 2. The control unit 3 includes the diagnostics module 39, whose first input is connected to the primary inlet temperature output 18, and whose second input is connected to the zone temperature output 5 of the temperature module 17, and whose third input is connected to the heat flow estimate output 26 of the power calculation module 19. Diagnostic information is communicated through the output 39 to the operator unit 29.

Figure 3:
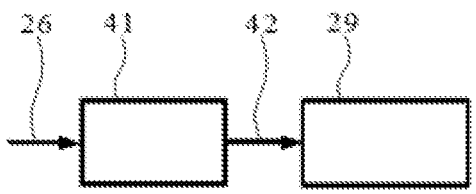
FIG. 3 shows the extension of the control unit by the heat-use module.

The augmentation of the control unit 3 by the heat-use module is depicted in FIG. 3. The control unit 3 includes the heat-use module 41, whose first input is connected to the heat flow estimate output 26. The module calculates the actual heat use and sends it using the output 42 to the operator unit 29.

From the above mentioned it is apparent that the pump 2 is connected to the primary circuit near the heat exchanger 1. The temperature sensors 15, 20 and 31 or 33 are mounted so that they measure the temperature of the primary heat-transport unit on the inlet and outlet of the heat exchanger 1 and the temperature in the zone 25. These temperature measurements are realized either by cable temperature sensors or wireless temperature sensors. The control unit 3 contains a microprocessor in which there is, by an algorithm, realized the flow estimation module 12, memory module 13, power calculation module 19 and heat flow controller 27. These modules altogether with a motor control unit 10 ensure the heat flow control. Next microprocessor algorithm realizes the temperature controller 36 controlling the temperature in the zone 25. Diagnostics module 39 and the heat-use module 41 are also realized algorithmically.

The control unit 3 further contains the motor control unit 10 and temperature module 17 which are standalone electronic units.

The heat flow control method is based on the heat flow equation $$Q_p = \dot{m}_p c_{p,p}(T_{p,inlet} - T_{p,outlet}),$$

where $Q_p[W]$ is, in steady state, the absolute heat flow from the primary liquid, $\dot{m}_p[kg/s]$ is the mass flow of the primary liquid, $c_{p,p}[J/kg\ K]$ is the mass specific heat capacity of the primary liquid and $(T_{p,inlet} - T_{p,outlet})[K]$ is the temperature difference in the primary liquid across the heat exchanger 1. The mass flow $\dot{m}_p$ is estimated by an algorithm, realizing the flow estimation module 12, in the microprocessor of the control unit 3 from the run-time parameters of the pump 2. Specific heat capacity is a constant know the physics and the temperature difference $(T_{p,inlet} - T_{p,outlet})$ is measured by the temperature sensors 15 and 20. The power calculation module 19 calculated by the above-mentioned equation the heat flow estimate and the heat flow controller 27 then controls the mass flow so that the heat flow estimate 26 reaches the heat flow demand 28. The heat flow demand 28 is communicated from the operator unit 29 or the temperature controller 36 when it is used.

The device and the control algorithms assure that the actual heat flow in the heat exchanger 1 is, when it is physically plausible, regulated to the heat demand value independently of the pressure changes on the primary stream, the changes in the primary inlet temperature, the changes in the secondary inlet temperature and the secondary liquid volumetric flow.

The run-time diagnostics of the heat exchanger 1, realized in module 39, is based on the effectivity method (NTU) and the equation $$Q_s = \varepsilon \dot{V}_s c_{V,s}(T_{p,inlet} - T_{s,inlet}),$$

where $Q_s[W]$ is the steady state heat flow to the secondary liquid, $\varepsilon[.]$ is the effectivity of the heat transfer, $\dot{V}_s[m^3/s]$ is the volumetric flow of the secondary liquid, $C_{V,s}[J/m^3\ K]$ is the volumetric specific heat capacity of the secondary liquid know from the physics and $(T_{p,inlet} - T_{s,inlet})[K]$ is the temperature difference between the primary inlet temperature and the secondary inlet temperature. The secondary inlet temperature is the zone temperature 35.

When the heat exchanger settles into a steady state, i.e. no dynamic thermal processes occur in the heat exchanger body, then the heat flow from the primary liquid equals to the heat flow to the secondary liquid $Q_p = Q_s$. Since the temperature differences are measured, the specific capacities are known constant, and the volumetric flow of the secondary liquid is considered constant—set for example by constant fan setting—the efficiency of the heat transfer in the heat exchanger 1 may be computed.

The efficiency values are stored in the memory unit 13 and analyzed in a long-term to reveal deterioration of the efficiency caused by fouling. In short-term, the efficiency may indicate a malfunction or other system changes.

The device may also act as a heat meter by use of the heat-use module 41. The absolute actual heat flow in the heat exchanger 1 is known from the heat flow estimate 26. Integration of the heat flow over a specified time period results in the heat-use over that period. The calculation may by for example be realized by the following equation $$ST(t) = T_m \sum_{k=t-T_{ST}}^{t} Q_p(k),$$

where $ST(t)[W]$ is the heat-use over the period $T_{ST}[s]$ and $T_m[s]$ is the heat flow measurement period.

UTILITY OF THE PATENT

The device according to the realization described above is intended to be used to control the power of heat exchangers independently of the primary liquid pressure and temperature changes and secondary liquid temperature and flow changes. It may further be used to control a temperature in a connected thermal zone, diagnose the heat exchanger and measure heat transferred from the primary liquid to the secondary liquid.

The invention claimed is:

1. Heat exchanger control and diagnostic apparatus comprising
    a heat exchanger having
        a primary inlet of a primary heat-transport liquid mounted with a first temperature sensor and
        a primary outlet of the primary heat-transport liquid mounted with a second temperature sensor,
        wherein the primary outlet is piped to a pump, the pump comprising a pump impeller connected to a motor, the primary heat-transport liquid being piped by plumbing from the pump impeller to a heat source and from the heat source back to the primary inlet;
    a control unit connected to the heat exchanger and the pump and comprising a motor control unit bi-directionally connected to the motor;
    the heat exchanger having a secondary inlet for a secondary heat-transport liquid and a secondary outlet ducted to a temperature zone and back to the secondary inlet,
    the control unit being augmented by a temperature module, the temperature module having a first input connected by a communication channel to an output of the temperature sensor, and a second input connected by a communication channel to an output of the second temperature sensor;
    the temperature module having an output for outputting a primary inlet temperature connected to one input of a power calculation module, and an output for outputting a primary outlet temperature connected to another input of the power calculation module, the power calculation module having a third input connected to a flow estimation module, one input of the flow estimation module being connected to an output of a memory unit, and another input being connected by a bus to an output of the motor control unit;
    an output of the power calculation module for outputting a heat flow estimate being connected to one input of a heat flow controller, and another input of the heat flow controller for inputting a heat flow demand—being connected to an output of an operator unit, and an output of the operator unit being connected to an input of the motor control unit.

2. The apparatus of claim 1, further comprising a third temperature sensor mounted to the heat exchanger secondary inlet, the third temperature sensor being connected by a communication channel to a third input of the temperature module, the temperature module having an output for a zone temperature connected to one input of a temperature controller, another input of the temperature controller for a temperature setpoint being connected to a second output of the operator unit and having output connected to the second input for the heat demand of the heat flow controller.

3. The apparatus as in claim 2, wherein the control unit is extended by a diagnostics module, the diagnostics module having a first input connected to the output of the temperature module for outputting the primary inlet temperature, and a second input connected to the output of the temperature module for outputting the zone temperature, and a third input connected to the output of the temperature module for outputting the heat flow estimate, and the diagnostics module having an output for outputting diagnostic information connected to the operator unit.

4. The apparatus of claim 1, further comprising a fourth temperature sensor placed in a thermal zone connected by a communication channel to the third input of the temperature module, the temperature module having an output for a zone temperature connected to one input of a temperature controller, another input of the temperature controller for a temperature setpoint being connected to a second output of the operator unit and having output connected to the second input for the heat demand of the heat flow controller.

5. The apparatus as in claim 4, wherein the control unit is extended by a diagnostics module, the diagnostics module having a first input connected to the output of the temperature module for outputting the primary inlet temperature, and a second input connected to the output of the temperature module for outputting the zone temperature, and a third input connected to the output of the temperature module for outputting the heat flow estimate, and the diagnostics module having an output for outputting diagnostic information connected to the operator unit.

6. The apparatus as in claim 1, wherein the control unit is extended by a heat-use module having a first input connected to the output of the power calculation module for outputting the heat flow estimate, and the heat-use module having an output for outputting a heat-use value connected to the operator unit.

* * * * *